Sept. 2, 1958 A. E. SWAN 2,850,106
REVERSIBLE AND VARIABLE PITCH PROPELLER
Filed Oct. 5, 1955 2 Sheets-Sheet 1

Aldon E. Swan
INVENTOR

BY *CA Snow &Co.*
ATTORNEYS.

Sept. 2, 1958 A. E. SWAN 2,850,106
REVERSIBLE AND VARIABLE PITCH PROPELLER
Filed Oct. 5, 1955 2 Sheets-Sheet 2

Aldon E. Swan
INVENTOR
BY *CA Snow & Co.*
ATTORNEYS.

United States Patent Office 2,850,106
Patented Sept. 2, 1958

2,850,106

REVERSIBLE AND VARIABLE PITCH PROPELLER

Aldon Edward Swan, Yuba City, Calif.

Application October 5, 1955, Serial No. 538,624

1 Claim. (Cl. 170—160.42)

This invention relates to a reversible and variable pitch propeller.

An object of this invention is to provide a variable and reversible pitch propeller for use with an outboard motor or the like, whereby the pitch of the propeller blades may be varied from zero to maximum forward and reverse.

Another object of this invention is to provide an improved variable pitch assembly which is simple in construction and also includes frangible connecting means for connecting the hub of the propeller assembly to the supporting structure so that the propeller assembly will be coupled from the driving means in the event an obstruction is struck by the propeller blades.

With the foregoing and other objects in view which will appear as the description proceeds, the invention consists of certain novel details of construction and combinations of parts, hereinafter more fully described and pointed out in the claims, it being understod that changes may be made in the construction and arrangement of parts without departing from the spirit of the invention as claimed.

Referring to the drawings.

Figure 1:
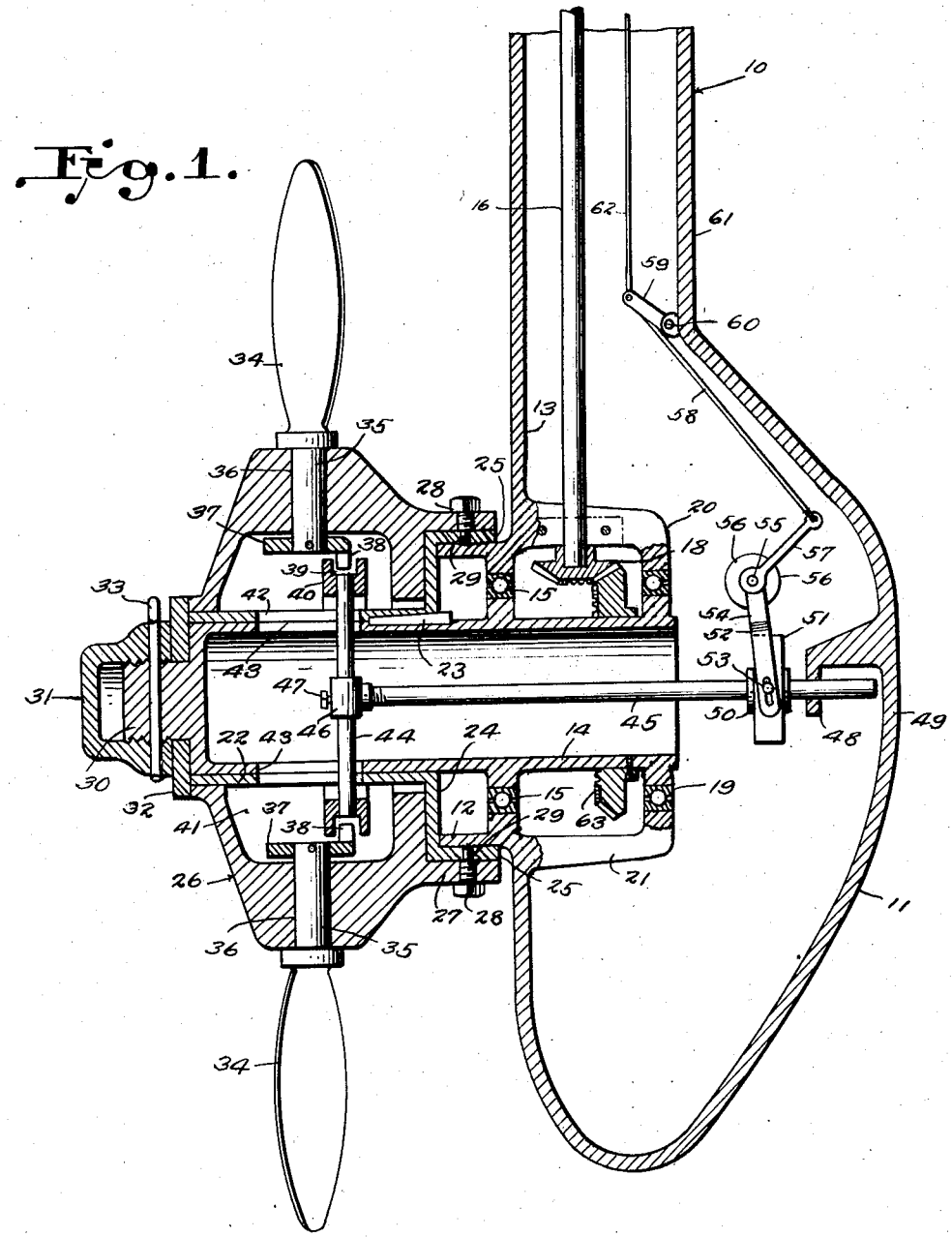
Figure 1 is a fragmentary vertical section of a variable pitch and reversible propeller construction constructed according to an embodiment of this invention, showing the propeller blades in forward driving position.

Referring to the drawings, the numeral 10 designates generally a vertically disposed tubular housing which is formed with an enlarged lower housing portion 11. The housing 10 is formed with a cylindrical boss 12 on the rear side of the vertical wall 13 thereof, and a tubular shaft 14 is rotatably disposed in bearings 15 carried by the boss or hub 12. A vertically disposed drive shaft 16 extends downwardly through the housing 10, being connected at its upper end to an engine, not shown. The shaft 16 is journaled in a bearing 17 carried by the wall 13 and a bevel gear 18 is secured on the lower end of the shaft 16. The inner end of the hollow shaft 14 projects into the enlarged housing 11 and is journaled in a bearing 19 carried by the supporting members 20 and 21. A cylindrical hub 22 is disposed about the outer portion of hollow shaft 14, being splined or keyed thereon, as indicated at 23. The cylindrical hub 22 is formed with an inner right-angular flange 24 and flange 24 terminates in a cylindrical flange 25 which is rotatably disposed about the boss 12. An outer hub generally indicated at 26, is disposed about the inner hub 22 and is formed with an inner flange 27 engaged by flange 25. The two flanges 25 and 27 are secured together by means of a plurality of sheer pins 28 which are threaded through flange 27 and include a reduced diameter sheer member 29 which extends into flange 25. This sheer member or pin 29 provides a means whereby outer hub 26 will be disconnected and free to rotate or to stand still when an obstruction is encountered by the propeller blades. The outer end of hollow shaft 14 is formed with a plug 30 on which a cap 31 is threaded. A pusher 32 is disposed about the inner end of plug 30 and bears against the outer ends of hub members 22 and 26. A cotter pin or locking member 33 is extended through cap 31 and plug 30.

A pair of propeller blades 34 are disposed radially of the hub 26 and each blade 34 includes a shank 35 rotatably disposed in a radial opening 36 formed in the hub 26. A ring or plate 37 is fixed on the inner end of each shank 35 and is formed with a shank pin 38 which is adapted to loosely engage in an annular groove 39 formed in a ring 40. The ring 40 is disposed in a hollow space 41 formed interiorly of the hub 26 and ring 40 is slidably disposed on the periphery of cylindrical hub 22. Hub 22 is formed with at least a pair of longitudinally extending slots or openings 42 and hollow shaft 14 is also formed with at least a pair of longitudinally extending slots or openings 43 adapted to register with openings 42. A blade adjusting rod 44 is disposed loosely in the openings 42 and 43 and is secured at its opposite ends in the ring 40. A longitudinally extending shaft or rod 45 is disposed in hollow shaft 14 and is provided at its forward end with a T-member 46, through which the bar or rod 44 extends. The bar or rod 44 may be fixed relative to the T-member 46 by means of a set screw 47. The opposite end of the rod 45 is slidably disposed in a bearing 48 which projects inwardly from the forward wall 49 of housing enlargements 11. A grooved collar 50 is fixed on the rod or bar 47 and a blade adjusting ring 51 is loosely disposed on the collar 50. A blade shifting fork 52 has the arms thereof loosely engaging pins 53 carried by the ring 51 and the shank 54 of the fork 52 is secured to a pin 55. The pin 55 is rotatably disposed in opposed bearing bosses 56, carried by the side walls of the housing member 11. A lever 57 is fixed at one end on the pin 55 and the lever 57 has rockably connected with its outer end the lower end of a link 58. The link 58 is rockably connected at its upper end to a rock lever 59 which is rockably mounted as at 60 on the wall 61 of housing 10. The lever 59 also has rockably connected therewith a vertically projecting link or rod 62 which extends upwardly to the upper portion of housing 10, whereby rod or link 62 may be manually moved vertically either up or down to effect adjustment of the propeller blades 34.

Figure 2:
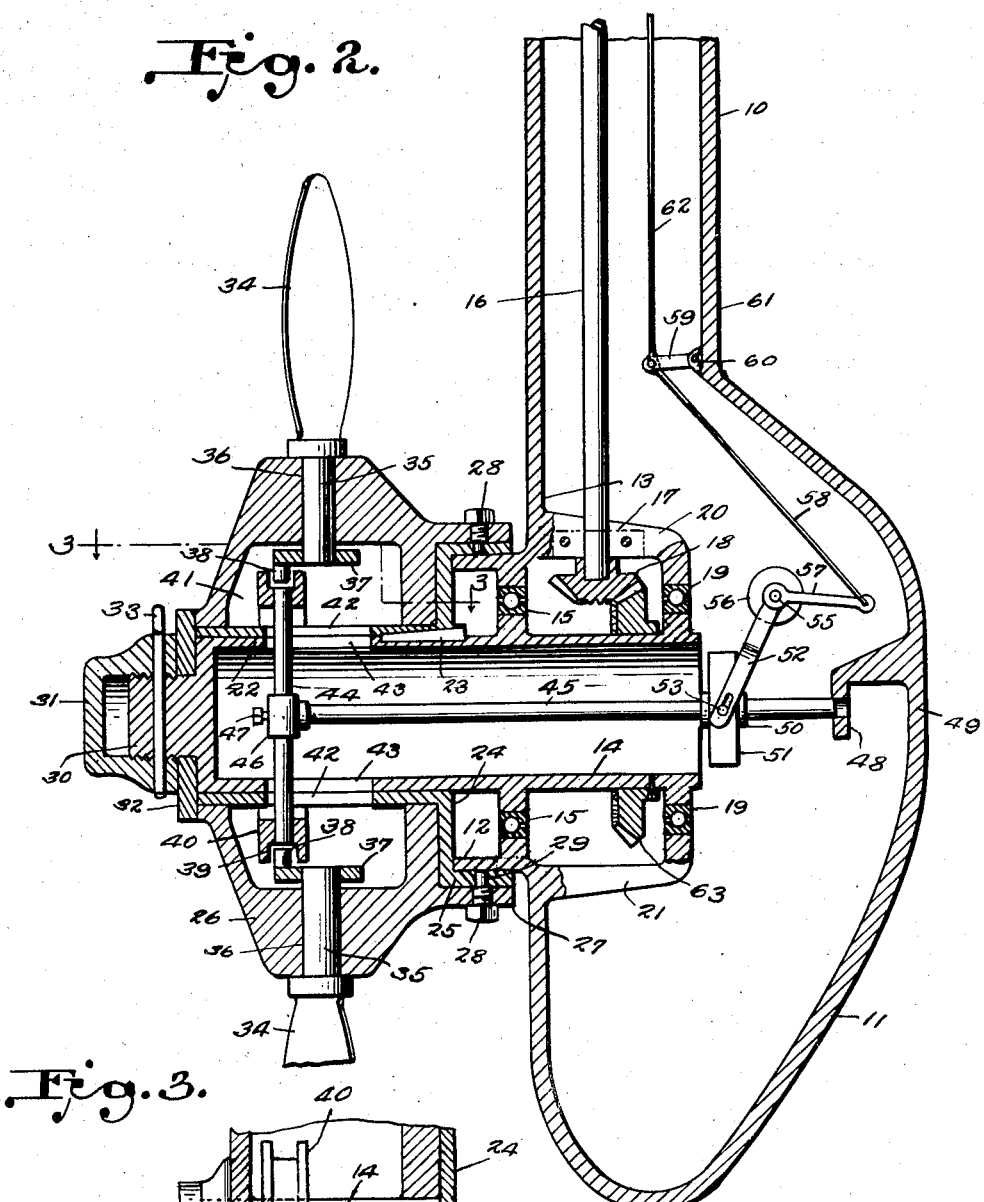
Fig. 2 is a view similar to Fig. 1, but showing the propeller blades in reverse position.
Figure 3:
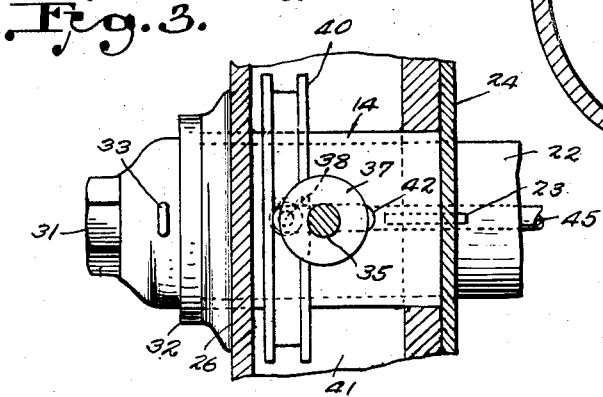
Fig. 3 is a fragmentary sectional view taken on line 3—3 of Fig. 2.

In the use and operation of this device the hub 26 is secured to hub 22 by the sheer pins 28—29, and the shaft 16 connected to the engine. The driving bevel gear 18 meshes with a driven bevel gear 63 which is fixed on the inner or rear end of shaft 14. In the driving positions of the blades 34, these blades will be disposed as shown in Fig. 1. When it is desired to reverse the positions of blades 34 link 62 is pushed downwardly so that rods 44 and 45 will be disposed in the positions shown in Fig. 2. Rearward movement of blade shifting ring 40 will rotate the shanks 35 and blades 34 will then be in their reversed driving position, as shown in Fig. 2. With blade shifting ring 40 disposed in alignment with shanks 35 of blade 34, the blades will be in a neutral non-driving position.

It will be apparent from the foregoing that the propeller blades may be adjusted from a maximum forward driving position to a maximum reverse position or the blades may be adjusted to any position between the two maximum positions.

What is claimed is:

A variable pitch propeller comprising a vertical tubular housing, an enlarged housing at the lower end of said vertical housing, a cylindrical bushing extending from the rear of said enlarged housing, a tubular shaft journaled in said bushing and projecting into said enlarged housing, an inner hub fixed relative to said tubular shaft, an outer hollow hub about said inner hub, a plurality of shear pins connecting said hubs together, a nut threaded on the outer end of said shaft, a washer between said nut and said inner and outer hubs, a grooved ring loose about said inner hub in said outer hub, said tubular shaft and inner hub having registering longitudinal openings, a bar extending transversely through said tubular shaft and through said openings, the opposite ends of said bar being fixed in said ring, a longitudinal bar in said tubular shaft fixed to said first bar, a pair of propeller blades rotatably carried by said outer hub, a crank pin fixed on the inner end of each blade and engaging in the groove of said ring, power driven gear means rotating said hollow shaft, a bell crank lever having one end pivoted to the end of said longitudinal bar in said enlarged housing below said tubular housing, said bell crank lever being pivoted in said enlarged housing, a second lever pivoted to other end of said bell crank lever, a link pivoted at one end to the other end of said second lever and at its other end to the side of said vertical housing, and a control rod connected to the pivotal connection of said link and said second lever and extending upwardly to a point exterior of said vertical housing whereby vertical movement of said control rod moves said longitudinal bar to move said ring to thereby rotate said blades relative to said outer hub.

References Cited in the file of this patent

UNITED STATES PATENTS

| | | |
|---|---|---|
| 1,977,077 | Martens et al. | Oct. 16, 1934 |
| 1,980,601 | Stickel | Nov. 13, 1934 |
| 2,308,749 | Gee | Jan. 19, 1943 |
| 2,478,244 | Cooley | Aug. 9, 1949 |
| 2,542,682 | Kloss | Feb. 20, 1951 |
| 2,689,541 | Williams | Sept. 21, 1954 |

FOREIGN PATENTS

| | | |
|---|---|---|
| 389,796 | Great Britain | June 16, 1931 |
| 453,536 | Italy | Dec. 3, 1949 |